United States Patent
Park

(10) Patent No.: US 8,937,461 B2
(45) Date of Patent: Jan. 20, 2015

(54) SYSTEM FOR CONTROLLING CHARGING OF BATTERY AND BATTERY PACK COMPRISING THE SAME

(75) Inventor: Chilsung Park, Yongin-si (KR)

(73) Assignee: Samsung SDI Co., Ltd., Yongin-si, Gyeonggi-Do (KR)

( * ) Notice: Subject to any disclaimer, the term of this patent is extended or adjusted under 35 U.S.C. 154(b) by 462 days.

(21) Appl. No.: 13/368,737

(22) Filed: Feb. 8, 2012

(65) Prior Publication Data
US 2012/0206111 A1 Aug. 16, 2012

(30) Foreign Application Priority Data
Feb. 10, 2011 (KR) ................ 10-2011-0011867

(51) Int. Cl.
*H02J 7/00* (2006.01)
(52) U.S. Cl.
CPC ........ *H02J 7/0029* (2013.01); *H02J 2007/0098* (2013.01)
USPC .......................................................... 320/163
(58) Field of Classification Search
USPC .......................................................... 320/163
See application file for complete search history.

(56) References Cited

U.S. PATENT DOCUMENTS

| | | | | |
|---|---|---|---|---|
| 4,052,656 A | * | 10/1977 | Lavell et al. .................. | 320/156 |
| 5,641,587 A | * | 6/1997 | Mitchell et al. ................. | 429/90 |
| 5,859,524 A | * | 1/1999 | Ettes .............................. | 320/132 |
| 6,118,250 A | * | 9/2000 | Hutchison et al. ............ | 320/110 |
| 6,873,135 B2 | * | 3/2005 | Nakatsuji ....................... | 320/132 |
| 7,793,125 B2 | * | 9/2010 | Berry et al. .................... | 713/320 |
| 8,129,947 B2 | * | 3/2012 | Chiasson et al. ............... | 320/132 |
| 2002/0195996 A1 | * | 12/2002 | Nakatsuji ....................... | 320/127 |
| 2007/0013346 A1 | * | 1/2007 | Oh .................................. | 320/160 |
| 2007/0188136 A1 | * | 8/2007 | Oh .................................. | 320/115 |
| 2007/0210757 A1 | | 9/2007 | Gangstoe et al. | |
| 2008/0168287 A1 | * | 7/2008 | Berry et al. .................... | 713/323 |
| 2009/0273320 A1 | * | 11/2009 | Ungar et al. ................... | 320/162 |

FOREIGN PATENT DOCUMENTS

| | | |
|---|---|---|
| JP | 06-245402 A | 9/1994 |
| KR | 10-2006-0014824 A | 2/2006 |
| KR | 10-2008-0105154 A | 12/2008 |
| KR | 10-2009-0014897 A | 2/2009 |

OTHER PUBLICATIONS

Korean Notice of Allowance dated Sep. 26, 2012 for Korean Patent Application No. KR 10-2011-0011867 which corresponds to captioned U.S. Appl. No. 13/368,737.

* cited by examiner

*Primary Examiner* — M'Baye Diao
(74) *Attorney, Agent, or Firm* — Knobbe Martens Olson & Bear LLP

(57) ABSTRACT

A system for controlling charging of a battery and a battery pack including the system are disclosed. The system includes a comparison unit that compares an actual output voltage value of a charger with an expected supply voltage value of the charger, and a control unit that resets a taper current value according to the comparison result.

20 Claims, 3 Drawing Sheets

SYSTEM FOR CONTROLLING CHARGING OF BATTERY AND BATTERY PACK COMPRISING THE SAME

CROSS-REFERENCE TO RELATED APPLICATION

This application claims priority to and the benefit of Korean Patent Application No. 10-2011-0011867, filed on Feb. 10, 2011, the entire content of which is incorporated herein by reference.

BACKGROUND

1. Field

The disclosed technology relates to a system for controlling charging of a battery and a battery pack using the same.

2. Description of the Related Technology

Rechargeable secondary batteries have been actively developed with the advent of portable electronic equipment such as cellular phones, notebook computers, camcorders, personal digital assistants (PDA), tablet computers, and the like.

Secondary batteries may be manufactured as a battery pack having a battery cell and a charger/discharger circuit. The battery cell is charged or discharged by external power or an external system using an external terminal in the battery pack. If the external power supply is connected to the battery pack using the external terminal, the battery cell is charged by power from the external power supply through the external terminal and the charger/discharger circuit. In addition, if the external system is connected to the battery pack using the external terminal, power of the battery cell is discharged to provide power to the external system with the external terminal and the charger/discharger circuit.

The battery pack includes a charging control system for controlling the charger/discharger circuit of a battery. The charging control system has a preset supply voltage value of a charger and a preset taper current value for detecting whether the battery pack is fully charged. The taper current value is a fixed value. If the battery pack is charged with a voltage less than the proper voltage from the charger, battery capacity may suffer because the battery pack may be overcharged to a level exceeding a capacity level defined in the battery cell specification.

SUMMARY OF CERTAIN INVENTIVE ASPECTS

One inventive aspect is a system for controlling charging of a battery. The system includes a comparison unit configured to compare an actual output voltage of a charger with an expected supply voltage value of the charger, and a control unit configured to reset a taper current value for detecting a full charge state of the battery according to the comparison result of the comparison unit.

Another inventive aspect is a battery pack. The battery pack includes a battery with one or more battery cells, and a battery management unit that measures a voltage of the battery and controls charging and discharging of the battery. The battery management unit includes a comparison unit configured to compare an actual output voltage of a charger with an expected supply voltage value of the charger, and a control unit configured to reset a taper current value for detecting a full charge state of the battery according to the comparison result of the comparison unit.

Another inventive aspect is a method of controlling charging of a battery. The method includes comparing an actual output voltage of a charger with an expected supply voltage value of the charger, and resetting a taper current value for detecting a full charge state of the battery according to the comparison result of the comparison unit.

DETAILED DESCRIPTION OF CERTAIN INVENTIVE EMBODIMENTS

Hereinafter, certain embodiments are described in detail with reference to the accompanying drawings such that they can easily be practiced by those skilled in the art.

Figure 1:
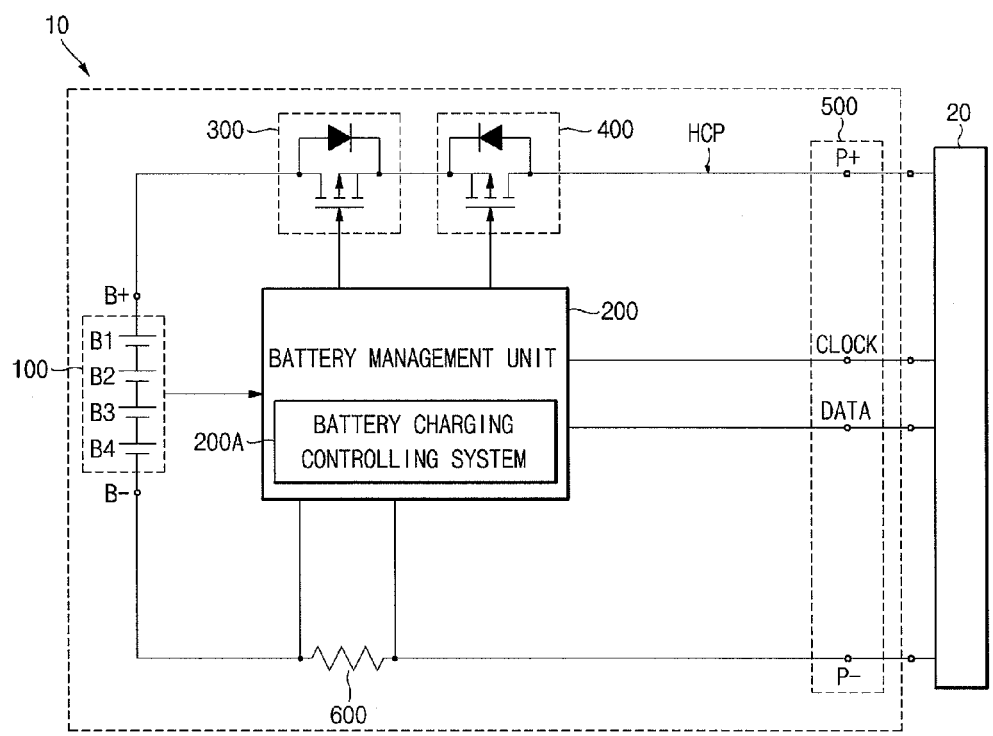
FIG. 1 is a circuit diagram illustrating the overall configuration of a battery pack according to an embodiment.

FIG. 1 is a circuit diagram illustrating a battery pack according to an embodiment. Referring to FIG. 1, the battery pack 10 includes a battery unit 100, a battery management unit 200, a charging device 300, a discharging device 400, a connector 500 and a sense resistor 600.

The battery pack 10 is connected to an external system 20 through the connector 500. The external system 20 may include, for example, a charger for charging the battery unit 100, or an external load such as a cellular phone or a portable notebook computer.

The battery pack 10 may be connected to the charger through the connector 500 to charge the battery unit 100. Alternatively, the battery pack 10 may be connected to the external load such as a portable electronic device through the connector 500 to power the external load by discharging of the battery unit 100. A high-current path (HCP) between the battery unit 100 and the connector 500 is used as a charging/discharging path, and a relatively large amount of current may flow through the HCP. A power terminal of the charger or external load 20 may be connected to a first pack terminal P+ and a second pack terminal P− of the connector 500, and communication terminals of the charger 20 may be connected to communication terminals CLOCK and DATA of the connector 500.

The battery unit 100 includes one or more battery cells B1, B2, B3, and B4, and is charged or discharged with a preset voltage. In FIG. 1, reference symbols B+ and B− denote electrode terminals, that is to say, a positive terminal B+ and a negative terminal B− of the serially connected battery cells B1, B2, B3, and B4. The number of battery cells of the battery unit 100 may vary according to the capacity required by the external load.

The battery management unit 200 detects a voltage of the battery unit 100 and controls operations of the charging device 300 and the discharging device 400, thereby controlling charging and discharging of the battery unit 100. For example, when the battery pack 10 is connected to the charger 20 through the connector 500, the battery management unit 200 sets the charging device 300 to an ON state and the discharging device 400 to an OFF state, thereby allowing the battery unit 100 to be charged. Alternatively, when the battery pack 10 is connected to the external system 20 through the connector 500, the battery management unit 200 sets the charging device 300 to an OFF state and the discharging device 400 to an ON state, thereby allowing the battery unit 100 to be discharged. Although not shown, the battery management unit 200 can detect each of the voltages of the respective battery cells B1, B2, B3, and B4. The battery management unit 200 may incorporate a system 200A for controlling charging of a battery, which will later be described in detail.

The charging device 300 and the discharging device 400 are connected on the HCP between the battery unit 100 and the connector 500 and are used in charging and discharging of the battery unit 100. The charging device 300 includes a field effect transistor (to be referred to as FET1) and a parasitic diode (to be referred to as D1). The discharging device 400 includes a field effect transistor (to be referred to as FET2) and a parasitic diode (to be referred to as D2). A connected direction in which a source and a drain of FET1 are connected is opposite to that of FET2. With this configuration, FET1 limits the flow of current from the connector 500 to the battery unit 100. FET2 is configured to limit the flow of current from the battery unit 100 to the connector 500. D1 and D2 are configured to allow the current to flow in a direction opposite to the direction in which the flow of current is limited.

The connector 500 is connected to the battery unit 100, and serves as a charging terminal for charging the battery unit 100 by being connected to the charger 20 during charging, or as a discharging terminal for discharging the battery unit 100 by being connected to the external load 20 during discharging. To this end, the connector 500 includes a first pack terminal P+ and a second pack terminal P−. The first pack terminal P+ is a positive pack terminal connected to the positive electrode terminal B+ of the battery unit 100. The second pack terminal P− is a negative pack terminal connected to the negative electrode terminal B− of the battery unit 100. If the charger 20 is connected to the connector 500, charging from the charger 20 to the battery unit 100 may be performed. If the external load 20 is connected to the connector 500, discharging from the battery unit 100 to the external load 20 may be performed. In addition, the connector 500 may include the communication terminals CLOCK and DATA connected to the battery management unit 200. The communication terminals CLOCK and DATA may include a clock terminal CLOCK and a data terminal DATA. If the charger 20 is connected to the connector 500, the communication terminals CLOCK and DATA enable communication between the battery management unit 200 and the charger 20. For example, the communication terminals CLOCK and DATA may transmit voltage information or charge control information of the battery unit 100 from the battery management unit 200 to the charger 20. Alternatively, the communication terminals CLOCK and DATA may transmit an alarm signal output from the battery management unit 200 to the external system 20.

The sense resistor 600 may be provided on the HCP between the battery unit 100 and the connector 500. For example, as shown, the sense resistor 600 may be connected between the negative terminal B− of the battery unit 100 and the second pack terminal P−. In addition, in this embodiment, the sense resistor 600 is connected to the battery management unit 200. Accordingly, the sense resistor 600 allows the battery management unit 200 to sense a voltage across the sense resistor 600 and, given a resistance value of the sense resistor 600, to identify charging and discharging currents. Thus, the sense resistor 600 transmits information regarding the charging current or discharging current of the battery unit 100 to the battery management unit 200.

Figure 2:
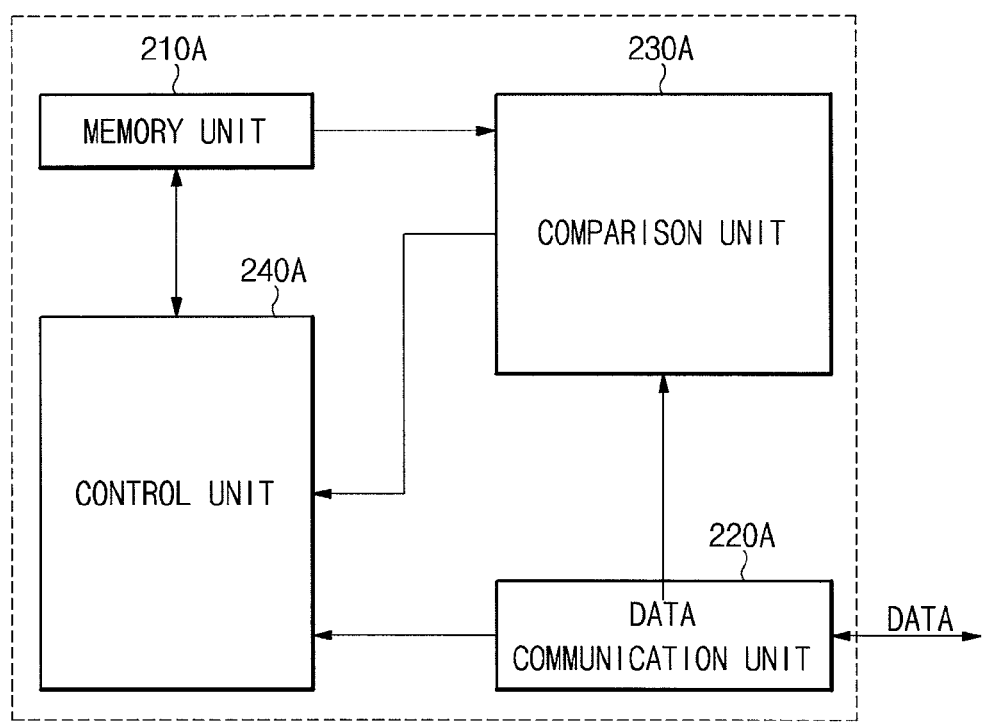
FIG. 2 is a block diagram illustrating a system for controlling charging of a battery according to an embodiment.

Hereinafter, a system 200A for controlling charging of a battery according to some embodiments are described. FIG. 2 is a block diagram illustrating a system for controlling charging of a battery according to an embodiment. Referring to FIG. 2, the system 200A for controlling charging of a battery includes a memory unit 210A, a data communication unit 220A, a comparison unit 230A and a control unit 240A.

The memory unit 210A stores a supply voltage value of a charger and a charging current value. The supply voltage value is a value of the voltage supplied from the charger 20 in accordance with the specification of the battery pack 10. The charging current value is used for detecting a full charge state of the battery unit 100 and may also be referred to as a taper current or a current taper. The memory unit 210A supplies the data stored therein to the comparison unit 230A and the control unit 240A. In addition, data of the taper current value reset by the control unit 240A may be stored in the memory unit 210A.

The data communication unit 220A may communicate with the charger 20 through the communication terminals CLOCK and DATA of the connector 500 to receive data of the voltage value output from the charger 20. The data communication unit 200A receives data from the charger 20 in, for example, regular cycles and transmits the received data to the comparison unit 230A and the control unit 240A, respectively.

The comparison unit 230A receives the supply voltage value of the charger 20 from the memory unit 210A and the output voltage value of the charger 20 from the data communication unit 220A. In addition, the comparison unit 230A compares the expected supply voltage value of the charger 20 with the actual output voltage value of the charger 20, and transmits comparison result data to the control unit 240A. The control unit 240A receives the comparison result data from the comparison unit 230A, resets the taper current value stored in the memory unit 210A according to the comparison result, and supplies the reset data to the memory unit 210A. Before describing the control unit 240A in more detail, the configuration and principle of the control unit 240A will first be described.

First, the maximum voltage $V_{cell\_max}$ of the battery unit 100 can be represented by the following equation (1):

$$V_{Cell\_max} = V_{OCV} + \text{Cell}_{impedance} \times I_{Cell}, \quad (1)$$

wherein $V_{OCV}$ is an open circuit voltage (OCV) of the battery unit 100, battery unit $\text{Cell}_{impedance}$ is the impedance of the battery unit 100, and $I_{CELL}$ is current of the battery unit 100, which may be determined by the taper current of the battery pack 10.

When the expected supply voltage value of the charger 20, stored in the memory unit 210A, is greater or less than the actual output voltage value of the charger 20, a battery capacity may suffer because of a high possibility of overcharging of the battery unit 100 to a level exceeding a level defined in the battery cell specification.

Therefore, it is beneficial to adjust the output voltage value of the charger 20, battery unit or the taper current value set in the battery pack 10. The output voltage value of the charger 20 cannot be controlled by a system of the battery pack 10. Accordingly, the control unit 240A resets the taper current value according to the output voltage value of the charger 20 and controls the battery unit 100 accordingly.

The control unit 240A according to an embodiment is now be described in detail. When the actual output voltage value of the charger 20 is greater than the expected supply voltage value of the charger 20 stored in the memory unit 210A, the control unit 240A increases the taper current value and stores the increased taper current value in the memory unit 210A, thereby resetting the taper current value. When the output voltage value of the charger 20 is less than the supply voltage value of the charger 20 stored in the memory unit 210A, the control unit 240A decreases the taper current value and stores the decreased taper current value in the memory unit 210A, thereby resetting the taper current value.

Figure 3:
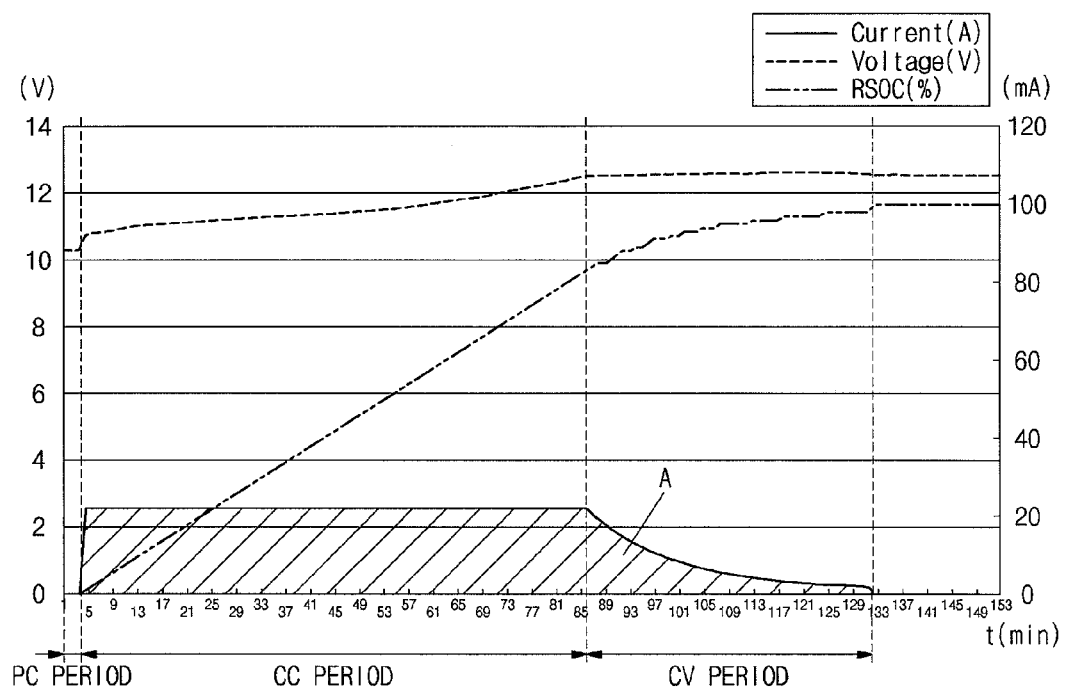
FIG. 3 is a graph illustrating a charging profile of a battery.

Hereinafter, the control unit 240A is described in more detail. FIG. 3 is a graph illustrating a charging profile of a battery. In FIG. 3, the horizontal axis represents a charging time (min), the left left vertical axis represents a charging voltage (V), and the right vertical axis represents a charging current (mA). In addition, the PC period indicates a pre-charge period, the CC period indicates a fast charged constant current period, and the CV period indicates a constant voltage termination period. The reference symbol 'A' is a charged amount of the battery unit 100, which can be described as in Equation (2) below:

Charged amount (mAh)=Current×Time, or

Charged amount (Wh)=Current×Voltage×Time. (2)

For example, when the output voltage value of the charger 20 is greater than the supply voltage value of the charger 20 stored in the memory unit 210A, the supply current value of the charger 20 also increases. Accordingly, charging (CC-CV charging) of the battery 100 is terminated too early, and the battery unit 100 may not be fully charged when the charging is terminated. In this case, as shown in FIG. 3, the CC period is extended, so that the area 'A' indicating the charged amount of the battery unit 100 is increased. Therefore, the control unit 240A increases the taper current ($I_{taper}$) value, thereby shortening the CV period and reducing the increased area 'A' (charge of battery 100).

Conversely, when the output voltage value of the charger 20 is less than the supply voltage value of the charger 20 stored in the memory unit 210A, the supply current value of the charger 20 also decreases. Accordingly, charging (CC-CV charging) of the battery 100 is terminated too late, and the battery unit 100 may be charged for a long period of time. In this case, as shown in FIG. 3, the CC period shown in FIG. 3 is shortened, so that the area 'A' indicating the charged amount of the battery unit 100 is decreased. Therefore, the control unit 240A decreases the taper current ($I_{taper}$) value, thereby extending the CC period and increasing the decreased area 'A' (charge of battery 100).

As described above, the control unit 240A resets the taper current ($I_{taper}$) value for detecting a full charge state of the battery unit 100 according to the output voltage value of the charger 20, thereby maintaining the charged amount of the battery unit 100 at a constant level. The control unit 240A may reset the taper current value using the following equation (3):

$$I_{taper}=I_{taper\_setting} \times I_{taper\_rate}, \quad (3)$$

where $I_{taper}$ is a taper current value to be reset, $I_{taper\_setting}$ is a preset taper current value, and $I_{taper\_rate}$ is a charging current rate of the battery, which is represented by the following equation (4):

$$I_{taper\_rate} = \frac{V_{RSOC\_90to95\%}}{V_{charging}}, \quad (4)$$

where $V_{RSOC\_90to95\%}$ is an output voltage value of the charger when the charged state of the battery unit 100 is 90% to 95%, and $V_{charging}$ is a preset supply voltage value of the charger 20.

Accordingly, the systems perform, or a user with the system may perform a method of controlling charging of a battery, where the method includes comparing an actual output voltage of a charger with an expected supply voltage of the charger, and resetting a taper current for detecting a full charge state of the battery according to the comparison result of the comparison unit. In some embodiments, the comparing is performed with a comparison unit. In addition, the resetting may be performed with a control unit, and the method may further include storing the supply voltage of the charger and the taper current in a memory.

In some embodiments, the method includes communicating the output voltage of the charger to a data communication unit. Furthermore, resetting the taper current includes increasing the taper current if the output voltage of the charger is greater than the supply voltage of the charger, and decreasing the taper current if the output voltage of the charger is less than the preset supply voltage of the charger. In some embodiments, the taper current is reset according to the following equation $I_{taper}=I_{taper\_setting} \times I_{taper\_rate}$ where $I_{taper}$ is a taper current to be reset, $I_{taper\_setting}$ is a taper current, and $I_{taper\_rate}$ is a charging current rate of the battery, which is represented by the following equation $$I_{taper\_rate} = \frac{V_{RSOC\_90to95\%}}{V_{charging}}$$

where $V_{RSOC\_90to95\%}$ is an output voltage of the charger when the charged state of the battery is 90 to 95%, and $V_{charging}$ is a preset supply voltage of the charger.

In some embodiments, the method includes charging the battery during a constant current period during which the charging current is substantially constant, and during a constant voltage period during which the charging voltage is substantially constant, and the control unit is configured to modify the duration of at least one of the constant current period and the constant voltage period in response to the comparison result.

Accordingly, battery capacity deviation due to the output voltage tolerance of a charger can be minimized. In addition, a reduction in the capacity due to external factors of a battery pack can be reduced, and the battery pack is controlled such that the battery is not overcharged to a level exceeding a capacity defined in the battery cell specification.

While various aspects have been described in connection with what is presently considered to be practical exemplary embodiments, it is to be understood that the invention is not limited to the disclosed embodiments, but, rather is intended to cover various modifications and equivalent arrangements.

What is claimed is:

1. A system for controlling charging of a battery, the system comprising:
    a comparison unit configured to compare an actual output voltage of a charger with an expected supply voltage of the charger; and
    a control unit configured to reset a taper current for detecting a full charge state of the battery according to the comparison result of the comparison unit,
    wherein the control unit resets the taper current using the following equation:

$$I_{taper}=I_{taper\_setting} \times I_{taper\_rate}$$

wherein $I_{taper}$ is a taper current to be reset, $I_{taper\_setting}$ is a taper current, and $I_{taper\_rate}$ is a charging current rate of the battery, which is represented by the following equation:

$$I_{taper\_rate} = \frac{V_{RSOC\_90to95\%}}{V_{charging}}$$

wherein $V_{RSOC\_90to95\%}$ is an output voltage of the charger when the charged state of the battery is 90 to 95%, and $V_{charging}$ is a preset supply voltage of the charger.

2. The system of claim 1, further comprising a memory unit in communication with the comparison unit, wherein the memory unit is configured to store the supply voltage of the charger and the taper current.

3. The system of claim 1, further comprising a data communication unit in communication with the control unit, wherein the data communication unit receives the output voltage from the charger.

4. The system of claim 1, wherein the control unit increases the taper current if the output voltage of the charger is greater than the supply voltage of the charger, and decreases the taper current if the output voltage of the charger is less than the supply voltage of the charger.

5. The system of claim 1, wherein the control unit charges the battery during a constant current period during which the charging current is substantially constant, and during a constant voltage period during which the charging voltage is substantially constant, and the control unit is configured to modify the duration of at least one of the constant current period and the constant voltage period in response to the comparison result.

6. The system of claim 1, additionally comprising a battery pack, wherein the battery pack comprises the comparison unit and the control unit.

7. A battery pack, comprising:
a battery including one or more battery cells; and
a battery management unit that measures a voltage of the battery and controls charging and discharging of the battery, wherein the battery management unit comprises:
a comparison unit configured to compare an actual output voltage of a charger with an expected supply voltage of the charger; and
a control unit configured to reset a taper current for detecting a full charge state of the battery according to the comparison result of the comparison unit.

8. The battery pack of claim 7, wherein the battery management unit further comprises a memory unit configured to store the supply voltage of the charger and the taper current.

9. The battery pack of claim 7, wherein the battery management unit further comprises a data communication unit that communicates with the charger to receive the output voltage of the charger.

10. The battery pack of claim 7, wherein the control unit increases the taper current if the output voltage of the charger is greater than the supply voltage of the charger, and decreases the taper current if the output voltage of the charger is less than the supply voltage of the charger.

11. The battery pack of claim 7, wherein the control unit resets the taper current using the following equation:

$$I_{taper} = I_{taper\_setting} \times I_{taper\_rate}$$

wherein $I_{taper}$ is a taper current to be reset, $I_{taper\_setting}$ is a taper current, and $I_{taper\_rate}$ is a charging current rate of the battery, which is represented by the following equation:

$$I_{taper\_rate} = \frac{V_{RSOC\_90to95\%}}{V_{charging}}$$

wherein $V_{RSOC\_90to95\%}$ is an output voltage of the charger when the charged state of the battery is 90 to 95%, and $V_{charging}$ is a preset supply voltage of the charger.

12. The battery pack of claim 7, wherein the control unit charges the battery during a constant current (CC) period during which the charging current is substantially constant, and during a constant voltage (CV) period during which the charging voltage is substantially constant, and the control unit is configured to modify the duration of at least one of the CC period and the CV period in response to the comparison result.

13. A method of controlling charging of a battery, the method comprising:
comparing an actual output voltage of a charger with an expected supply voltage of the charger; and
resetting a taper current for detecting a full charge state of the battery according to the comparison result of the comparing,
wherein the taper current is reset according to the following equation:

$$I_{taper} = I_{taper\_setting} \times I_{taper\_rate}$$

wherein $I_{taper}$ is a taper current to be reset, $I_{taper\_setting}$ is a taper current, and $I_{taper\_rate}$ is a charging current rate of the battery, which is represented by the following equation:

$$I_{taper\_rate} = \frac{V_{RSOC\_90to95\%}}{V_{charging}}$$

wherein $V_{RSOC\_90to95\%}$ is an output voltage of the charger when the charged state of the battery is 90 to 95%, and $V_{charging}$ is a preset supply voltage of the charger.

14. The method of claim 13, wherein the comparing is performed with a comparison unit.

15. The method of claim 13, wherein the resetting is performed with a control unit.

16. The method of claim 13, further comprising storing the supply voltage of the charger and the taper current in a memory.

17. The method of claim 13, further comprising communicating the output voltage directly from the charger to a data communication unit.

18. The method of claim 13, wherein resetting the taper current comprises increasing the taper current if the output voltage of the charger is greater than the supply voltage of the charger, and decreasing the taper current if the output voltage of the charger is less than the supply voltage of the charger.

19. The method of claim 13, further comprising charging the battery during a constant current period during which the charging current is substantially constant, and during a constant voltage period during which the charging voltage is substantially constant, and the control unit is configured to modify the duration of at least one of the constant current period and the constant voltage period in response to the comparison result.

20. The method of claim 13, wherein the method includes using a battery pack, wherein the comparing is performed via a battery pack component and the resetting is performed via a battery pack component.

* * * * *